US006447638B1

(12) United States Patent
Maeda

(10) Patent No.: US 6,447,638 B1
(45) Date of Patent: Sep. 10, 2002

(54) TAPE SQUEEZING DEVICE

(75) Inventor: Tsuyoshi Maeda, Tokyo (JP)

(73) Assignee: Lintec Corporation, Tokyo (JP)

( * ) Notice: Subject to any disclaimer, the term of this patent is extended or adjusted under 35 U.S.C. 154(b) by 76 days.

(21) Appl. No.: 09/672,016

(22) Filed: Sep. 29, 2000

Related U.S. Application Data

(62) Division of application No. 09/192,417, filed on Nov. 16, 1998, now Pat. No. 6,152,203.

(30) Foreign Application Priority Data

Nov. 19, 1997 (JP) ........................................... 9-318473

(51) Int. Cl.[7] ........................... B65C 3/02; B32B 31/00

(52) U.S. Cl. .................... 156/477.1; 156/212; 156/216; 156/384

(58) Field of Search ................................ 156/489, 486, 156/475, 212, 216, 391, 483, 484, 485, 478, 479, 477.1, 277

(56) References Cited

U.S. PATENT DOCUMENTS

| | | | |
|---|---|---|---|
| 2,165,540 A | 7/1939 | Engel | 156/475 |
| 2,916,079 A | 12/1959 | Schiefer | 156/391 |
| 4,211,598 A | 7/1980 | Diegel | 156/489 |
| 4,401,503 A | 8/1983 | Hertel | 156/461 |

FOREIGN PATENT DOCUMENTS

| | | |
|---|---|---|
| JP | 51-135015 | 11/1976 |
| JP | 62-46780 | 2/1987 |
| JP | 9-132218 | 5/1997 |

*Primary Examiner*—Linda Gray
(74) *Attorney, Agent, or Firm*—Finnegan, Henderson, Farabow, Garrett & Dunner, L.L.P.

(57) ABSTRACT

The present invention is directed to a tape squeezing device for folding back side edge portions in a width direction of a strip of adhesive tape applied on a work to run the side edge portions over respective side end portions of the work. The tape squeezing device includes a main body formed with a V-shaped first groove portion having an open angle, a V-shaped second groove portion have a smaller open angle than the open angle of the first groove portion, and a V-shaped third groove portion having substantially the same open angles as the open angle of the second groove portion, each of the groove portions being spaced apart from one another at a predetermined interval. The tape squeezing device also includes an expandable elastic sheet fixed to the main body and arranged to contact the side end portions of the work and cover a portion of one of the three grooved portions, the elastic sheet having a cushion layer and a lubricating surface layer. The third groove portion has a base end portion integral with the main body and a tip end portion pivotable toward and away form the base end portion for permitting the open angle of the third groove portion to be reduced relative to the open angle of the second groove portion.

3 Claims, 10 Drawing Sheets

TAPE SQUEEZING DEVICE

This is a division of application Ser. No. 09/192,417, filed Nov. 16, 1998 incorporated herein by reference now U.S. Pat. No. 6,152,203.

BACKGROUND OF THE INVENTION

1. Field of the Invention

The present invention relates to a tape squeezing device designed for folding back both side edge portions in a width direction of a strip form adhesive tape attached onto a work with running the side edge portions thereof over both lateral edges of the work to adhere the both side edge portions of the adhesive tape onto the work.

This application is based on Patent Application No. 9-318473 (1997) filed Nov. 19, 1997 in Japan, the content of which is incorporated hereinto by reference.

2. Description of the Related Art

Painting eggshell black on inside and outside of a door sash of an automotive vehicle is desirable for restricting reflection of light of the door sash as viewed externally, particularly from the side portion of a vehicle body to certainly provide a neat appearance not only an interior but also a whole vehicle body.

For this purpose, it has been conventionally performed to perform spray painting of delustering black paint on the door sash portion. However, spray painting encounters various problems as requiring investment for additional facility for maintaining work environment good enough, taking a long period for drying paint, and so forth. As a solution for such drawback, Japanese Patent Application Laying-open No. 51-135015 (1976) or Japanese Patent Application Laying-open No. 62-46780 (1987) proposes application of delustering black adhesive tape having high weather resistance and high wear resistance on a door sash portion, in place.

Normally, when such black adhesive tape is attached onto the door sash, both side edge portions in the width direction of the adhesive tape run over the lateral edges of the work extending longitudinal direction. Therefore, during finishing work squeezing process, in which the side edge portions in the width direction of the adhesive tape are folded back inwardly to adhere on the work, and, in conjuction therewith, bubble interpositioning occurs between the adhesive tape and the door sash.

As a device to be used for such squeezing process, there has been known a folding and adhering jig for the adhesive tape as disclosed in Japanese Patent Application Laying-open No. 9-132218 (1997). The jig is designed to operate a depression means mounted on a jig body to wrap guide forming means to a body, to which the adhesive tape is to be applied so that the adhesive tape is interfolded between the guide forming means and the body to be applied the adhesive tape.

The conventional folding and adhering jig disclosed in Japanese Patent Application Laid-open No. 9-132218 (1997) has right-cut and left-cut corresponding to a right door and a left door of an automotive vehicle. Therefore, in case of sedan type passenger vehicle, four kinds of folding and adhering jigs adapted for front and rear, and left and right, namely four doors, have to be used to make squeezing process quite troublesome.

When the tape squeezing device is engaged to the door sash to move therealong, since the guide forming means, which has elasticity and is in contact with the door sash, difficulty is encountered in accurately setting the position of the folding and adhering jig relative the door sash. Particularly, it is possible to cause tilting, or pitching in motion direction to cause difficulty in folding the adhesive tape in good shape.

SUMMARY OF THE INVENTION

It is an object of the present invention to a tape squeezing device, which can convolute both side edge portions in a width direction of the adhesive tape relative to a left and right front door sash or rear door sash to fold back for accurately adhering thereonto, in a relatively easy and quick fashion without requiring a skilled worker.

A first aspect of the present invention is a tape squeezing device for folding back both side edge portions in a width direction of a strip form adhesive tape applied on a work to run the both side edge portions over both side end portions of the work, comprises:

a groove form recessed portion having a bottom wall portion and a pair of side wall portions extending from both sides in width direction and opposing to each other;

a pair of tilted surface portions arranged on both end sides in a longitudinal direction of the recessed portion and tilting in a longitudinal direction of the recessed portion to gradually reduce a height of the side wall portion from the bottom wall portion;

a main body formed with the tilted surface portions and the recessed portions;

an elastic sheet fixed to the main body and arranged along the recessed portion and the tilted surface portion, the elastic sheet having a cushion layer and a lubricating surface layer;

a pair of squeezing levers respectively held for reciprocal motion in opposing direction of the pair of side wall portions relative to the main body, the squeezing levers having tip ends located away from the bottom wall portion and being adapted to project into the recessed portion substantially in parallel to the bottom wall portion;

a bracket having a base end portion pivoted on the main body via a pin for pivot motion, the bracket having a tip end portion projecting from any one side of both ends in the longitudinal direction of the recessed portion; and an adhesive tape guide roller rotatably mounted on the tip end portion of the bracket and contacting with one end portion of the work, in a condition where the tip end portions of the pair of squeezing levers are projected into the recessed portion, both side end portions in the width direction of the work being caught by the tip end portions of the pair of squeezing lever and the recessed portion via the elastic sheet.

According to the present invention, the recessed portion is engaged with one end portion of the work, on which the adhesive tape is applied, the tip end portions of a pair of squeezing levers are projected into the recessed portion to catch the work by the tip end portions of the squeezing levers and the recessed portion via the elastic sheet to fold back the both side edge portions in the width direction of the adhesive tape applied to the work to fit on the latter. With maintaining this condition, the tape squeezing device is moved along the longitudinal direction with contacting the adhesive tape guide roller onto one side end in the width direction of the work to fold back both side edge portions in the width direction of the adhesive tape applied to the work to fit onto the side end portion in the width direction of the work.

In the tape squeezing device according to the first aspect of the present invention, a spring members may be respectively disposed to bias the tip end portions of the pair of squeezing levers away from each other.

The outer peripheral surface of the adhesive tape guide roller may be formed with a rubber-like elastic material.

The lubricating surface layer of the elastic sheet may be a cloth having flexibility.

According to the tape squeezing device by the first aspect of the present invention, with respect to the longitudinal direction of the recessed portion, the tilted portion, squeezing levers and so forth are formed symmetrically, and the base end portion of the bracket supporting the adhesive tape guide roller is pivoted at the center portion of the main body for pivot motion. Therefore, for the work having left-cut and right-cut, the tape squeezing device can be adapted to be used for any work by pivoting the bracket to simplify the mechanism to produce at low cost.

Furthermore, upon moving the main body along the work, the main body can be moved with maintaining the adhesive tape guide roller in contact with the work. Therefore, attitude of the main body relative to the main body can always be held constant to permit tape squeezing operation without any fluctuation.

A second aspect of the present invention is a tape squeezing device for folding back both side edge portions in a width direction of a strip form adhesive tape applied on a work to run the both side edge portions over both side end portions of the work, comprises:

- a main body formed with a V-shaped first groove portion having an open angle, a V-shaped second groove portion having smaller open angle than the open angle of the first groove portion and a V-shaped third groove portion having substantially the same open angle as the open angle of the second groove portion, each the groove portions being apart from one another at predetermined interval; and
- an expandable elastic sheet respectively contacting both side end portions of the work fixed to the main body and respectively covering the three grooved portions, and the elastic sheet having a cushion layer and a lubricating surface layer,
- the third groove portion having a base end portion integral with the main body and a tip end portion pivotable toward and away from the base end portion for permitting to reduce the open angle to be smaller than that of the second groove portion.

According to the present invention, the first to third groove portions are pressed onto one end portion of the work, to which the adhesive tape is applied, and the tip end portion of the third groove portion is rotated in the folding back direction of the adhesive tape. Thus, the work is caught within the first to third groove portions to fold back the both side edge portions in the width direction of the adhesive tape applied on the work to fit onto both end portion in the width direction of the work. With maintaining this condition, the tape squeezing device is longed long longitudinal direction of the work to fold back the both side edges of the adhesive tape applied to the work to fit onto the both end portions in the width direction of the work.

In the tape squeezing device according to the second aspect of the present invention, the lubricating surface layer of the elastic sheet is a cloth having flexibility.

According to the tape squeezing device by the second aspect of the present invention, it is able to fold the adhesive tape in good shape without tilting, or pitching in motion direction, and to perform easily and quickly tape squeezing operation without requiring a skilled worker.

The above and the other objects, effects, features and advantages of the present invention will become more apparent from the following description of embodiments thereof taken in conjunction with the accompanying drawings.

DETAILED DESCRIPTION OF THE PREFERRED EMBODIMENTS

A tape squeezing device according to the present invention will be explained hereinafter in detail in terms of the first embodiment, in which the tape squeezing device is applied for an adhesive tape to be applied to a front door outer sash or a rear door outer sash of a passenger vehicle, with reference to FIGS. 1 to 9. However, the present invention is not limited to the illustrated embodiments, but is applicable for other fields of technologies, in which similar problems may be encountered.

Figure 1:
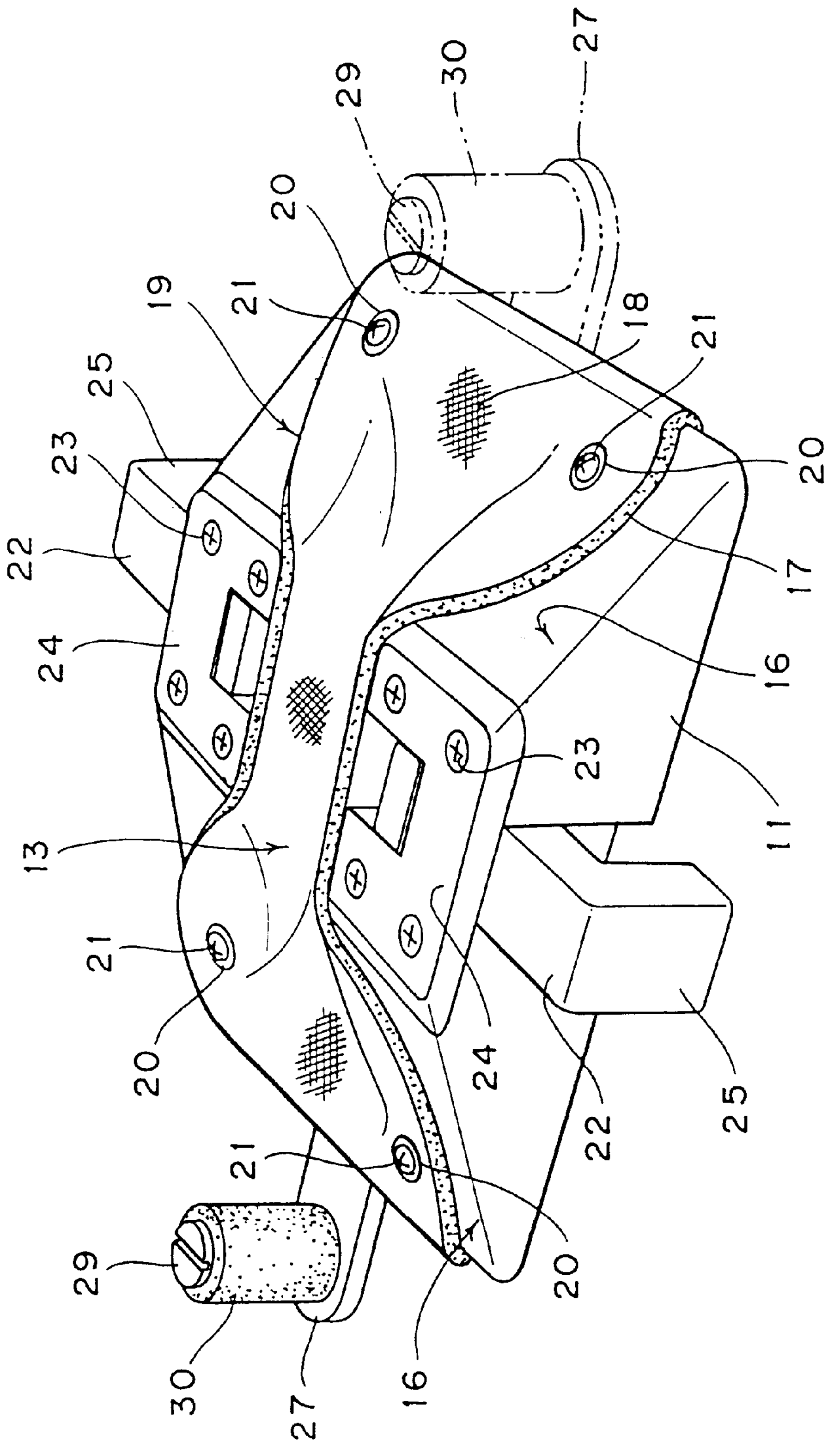
FIG. 1 is a perspective view illustrating an external appearance of one embodiment of a tape squeezing device according to the present invention.
Figure 2:
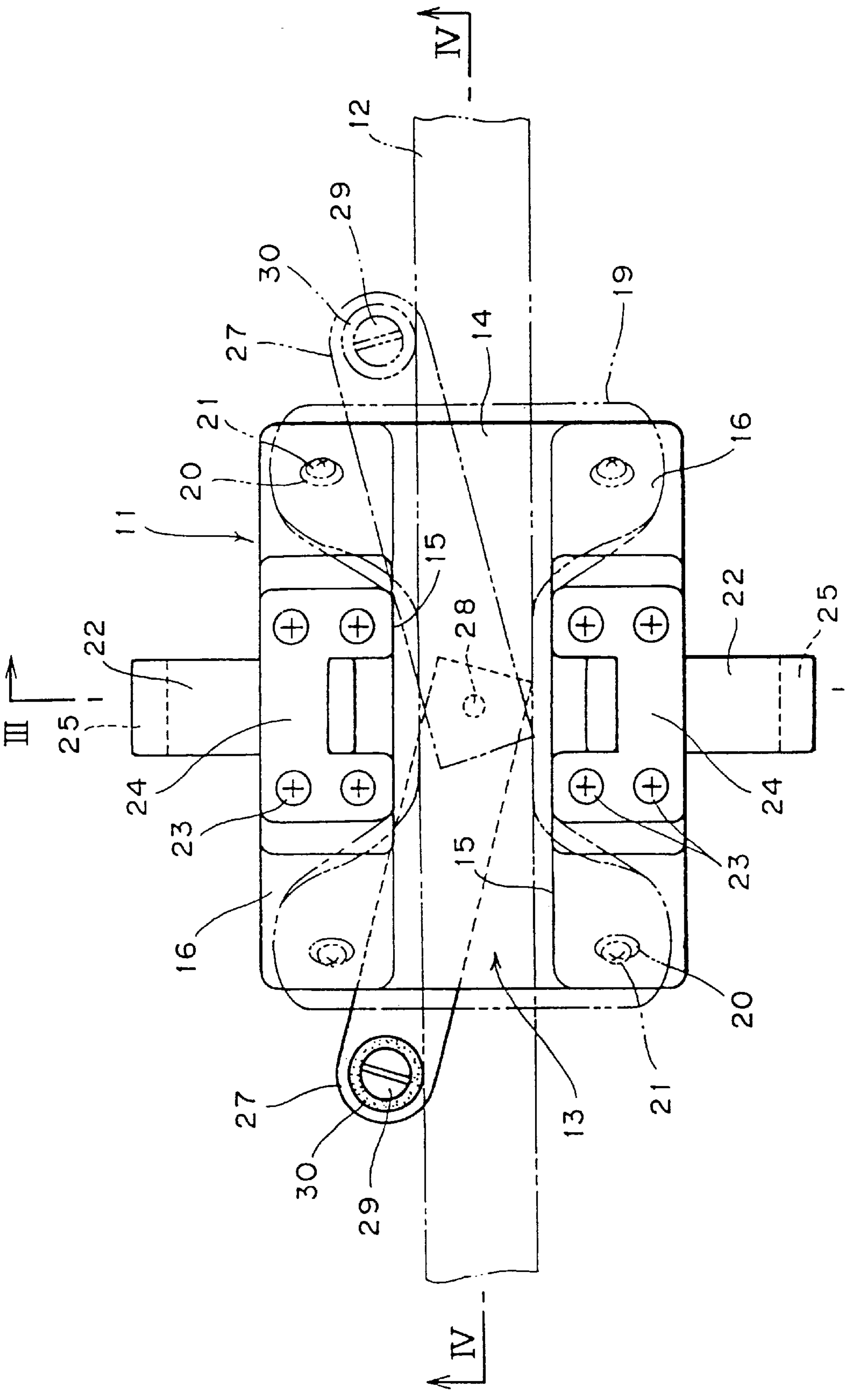
FIG. 2 is a plan view of one embodiment of the tape squeezing device shown in FIG. 1, which is illustrated in a condition where an elastic sheet is removed.
Figure 3:
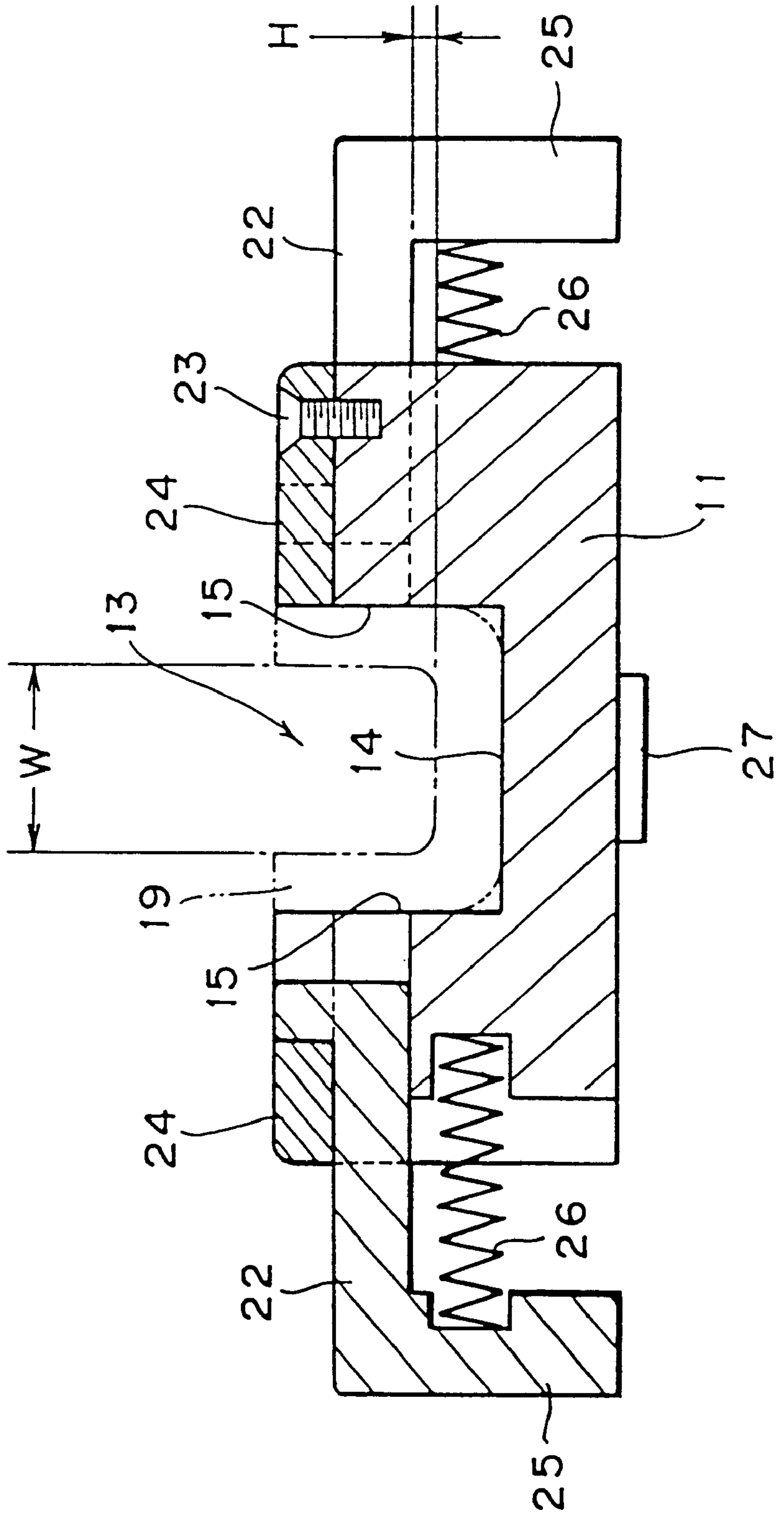
FIG. 3 is a section taken along line III—III of FIG. 2.
Figure 4:
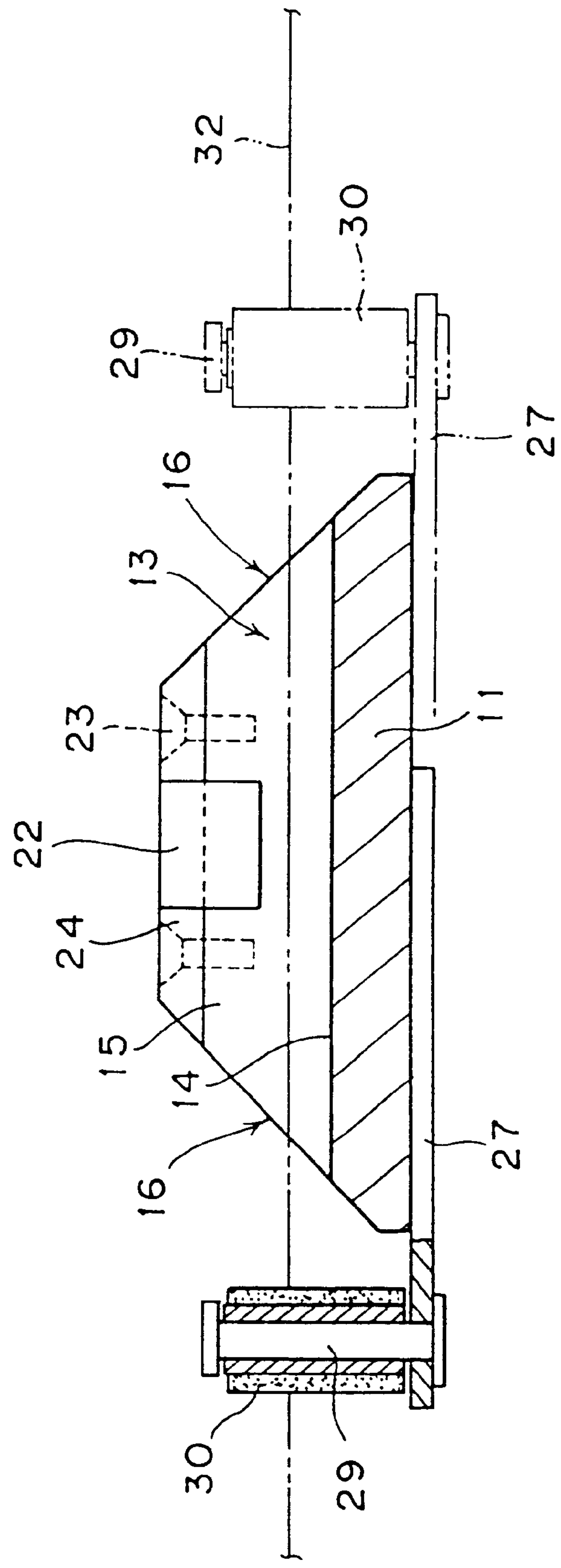
FIG. 4 is a section taken along line IV—IV of FIG. 2.
Figure 5:
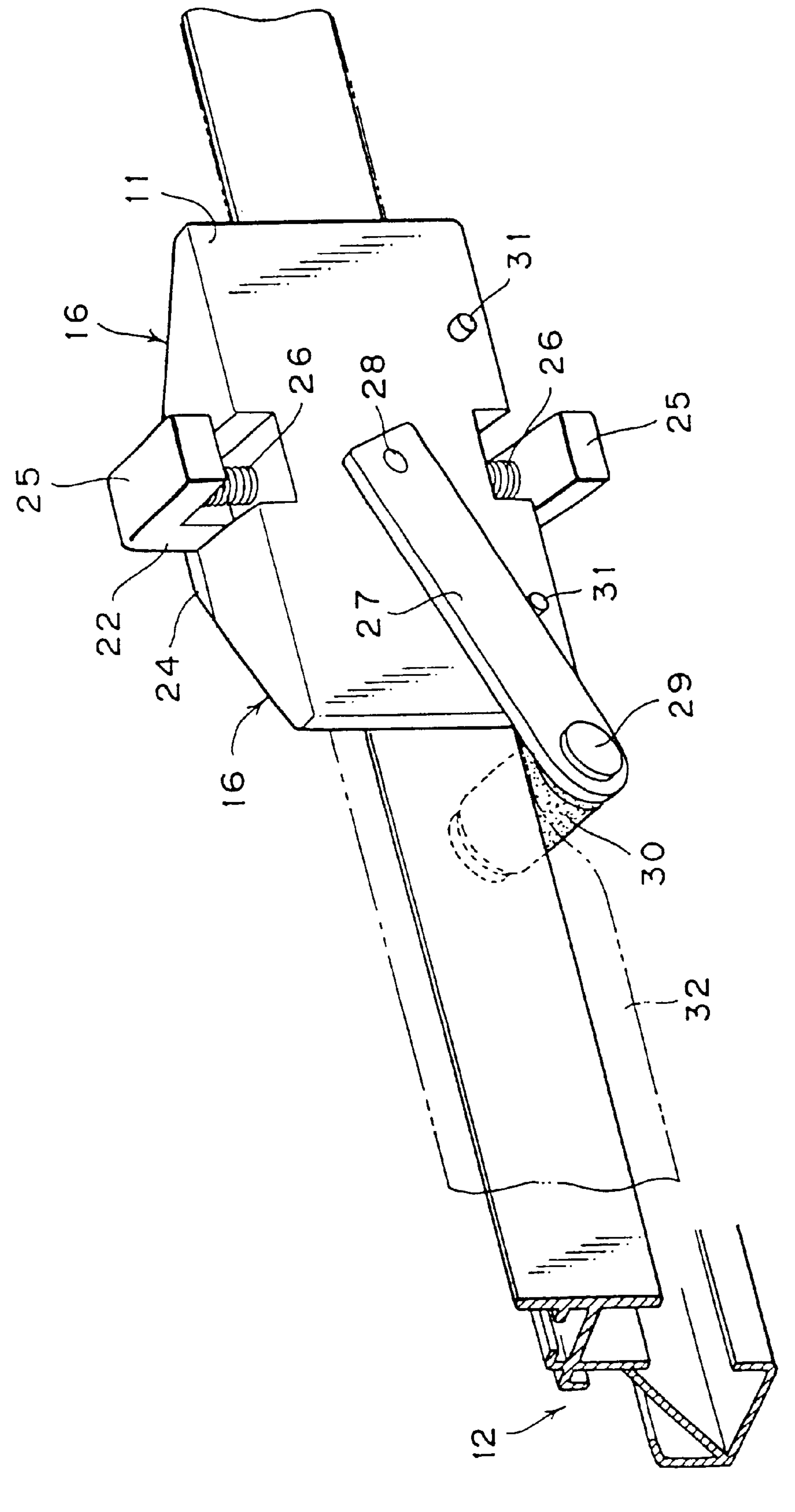
FIG. 5 is a perspective view of one embodiment of the tape squeezing device which is illustrated in a condition during squeezing operation.

FIG. 1 shows an external appearance of one embodiment of a tape squeezing device according to the present invention, FIG. 2 is a plan view in a condition where an elastic sheet is removed, FIG. 3 is a section taken along line III—III of FIG. 2, FIG. 4 is a section taken along line IV—IV of FIG. 2 and FIGS. 5 to 9 respectively show conditions during squeezing operation.

At a center portion of a main body 11 which has a bottom surface of rectangular shaped configuration, a groove shaped recessed portion 13 for receiving a front door outer sash or a rear door outer sash (hereinafter simply referred to as door outer sash) 12 is formed to extend in a longitudinal direction. The recessed portion 13 has a bottom wall portion 14 and a pair of mutually opposing side wall portions 15 vertically extended from both side edges in the width direction of the bottom wall portion 14. On both end portions of the recessed portion 13 in the longitudinal direction, a pair of tilted surface portions 16, in which heights of the side wall portions 15 from the bottom wall portion 14 of the recessed portion 13 are gradually reduced toward the longitudinal ends, are formed in the main body 11.

On the entire area of the recessed portion 13 and portions of a pair of tilted surface portion 16 adjacent the recessed portion 13, an expandable elastic sheet 19 which has a cushion layer 17 and a lubricating surface layer 18, is arranged. The longitudinal end portion of the elastic sheet 19 along the recessed portion 13 is fixed to the main body 11 at the tilted surface portions 16 by means of fastening screws 21 via washers 20. In this condition, a distance W of the elastic sheet 19 along opposing direction of a pair of side wall portions 15 has to be set corresponding to a width dimension of the door outer sash 12 to be inserted therein to be the same as the width dimension of the door outer sash or greater than thereof. The cushion layer 17 of the elastic sheet 19 is formed of foamed neoprene type or silicone type rubber having closed cell. On the other hand, the lubricating surface layer 18 is formed with an expandable cloth, a knitted fabric of chemical fiber, such as polyester, nylon or so forth, which is capable of following with elastic deformation of the cushion layer 17.

On the center portion of the main body 11, a pair of squeezing levers 22 reciprocally engaging in opposing direction of a pair of side wall portions 15 of the recessed portion, are mounted. These squeezing levers 22 are held so as not to fall off the main body 11 by a lever holding plate 24, which, in turn, is fixed via a plurality of (four in the shown embodiment) fastening screws 23. The tip end portion of the squeezing lever 22 is arranged away from the bottom wall portion 14 of the recessed portion 13. A height H from the surface of the elastic sheet 19 located in the bottom wall portion 14 of the recessed portion 13 and the tip end portion of the squeezing lever 22 has to be set to be greater than or equal to a thickness of the door outer sash 12, which is to be inserted into the recessed portion 13. On the end portion of the squeezing lever 22 located at the opposite side to the tip end portion, a fiber hook portion 25 is formed. Between respective of finger hook portions 25 and the main body 11, compression springs 26 for disposed for biasing the tip end portion of the squeezing lever 22 away from the side wall portions 15 of the recessed portion 13. By depressing the fiber hook portions 25 against spring forces of the compression springs 26, the tip end portions of the squeezing levers 22 project into the recessed portion 13 causing elastic deformation of the elastic sheet 19.

At the center portion on the back surface side of the main body 11, a base end portion of a bracket 27 is pivoted via a pivot pin 28 which extends perpendicularly with respect to the bottom wall portion 14 of the recessed portion 13, for pivotal movement thereabout. On the tip end portion of the bracket 27, which can be projected frontwardly from both of the longitudinal ends of the recessed portion 13, base end portion of a roller supporting shaft 29 projecting in parallel direction with the pivot pin 28 is fixed. On the roller supporting shaft 29, an adhesive tape guide roller 30 is rotatably mounted to contact with a side edge in the width direction of the door outer sash 12. A pair of stopper pins 31 defining two pivoting end positions of the bracket 27 are projected on the back surface side of the main body 11 so that the adhesive tape guide roller 30 can be switched between a first working position (shown by solid line in the drawing), in which the adhesive tape guide roller 30 is projected from either one side of both of longitudinal ends of the recessed portion 13, and a second working position (shown by two-dotted line in the drawing), in which the adhesive tape guide roller 30 is projected from other side.

Figure 7:
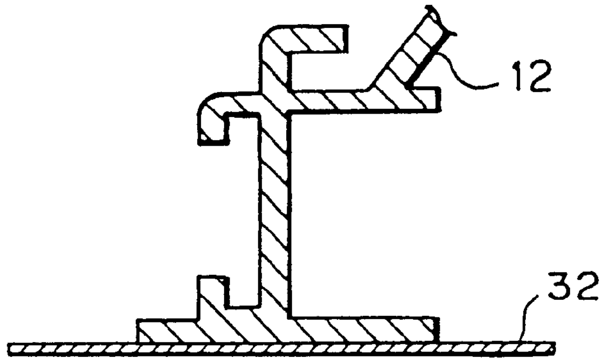
FIG. 7 is a conceptual illustration showing an application state of an adhesive tape relative to a door outer sash associating with progress of squeezing operation together with FIGS. 8 and 9.
Figure 8:
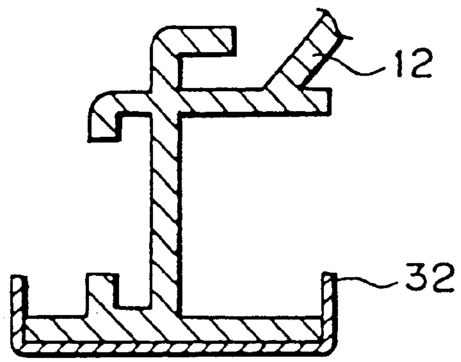
FIG. 8 is a conceptual illustration showing an application state of an adhesive tape relative to a door outer sash associating with progress of squeezing operation together with FIGS. 7 and 9.

Upon actual operation, as shown in FIG. 7, one end portion of the door outer sash 12, on which the adhesive tape 32 is applied to run over both side edge portions along the width direction of the door outer sash 12, is engaged with the recessed portion 13 of the tape squeezing device. In this case, the pivot position of the bracket 27 relative to the main body 11 is switched so that the adhesive tape guide roller 30 is located on the front side of the moving direction of the tape squeezing device with respect to the door outer sash 12. Then, the adhesive tape guide roller 30 is pushed onto one end (lower end) in the width direction of the door outer sash 12 to fold back the adhesive tape running over one end in the width direction of the door outer sash 12 inwardly, namely toward the opposite side of the bottom portion of the main body 11 (see FIG. 8). In this condition, the finger hook portions 25 of a pair of squeezing levers 22 are operated to push the tip ends thereof into the recessed portion 13.

Figure 6:
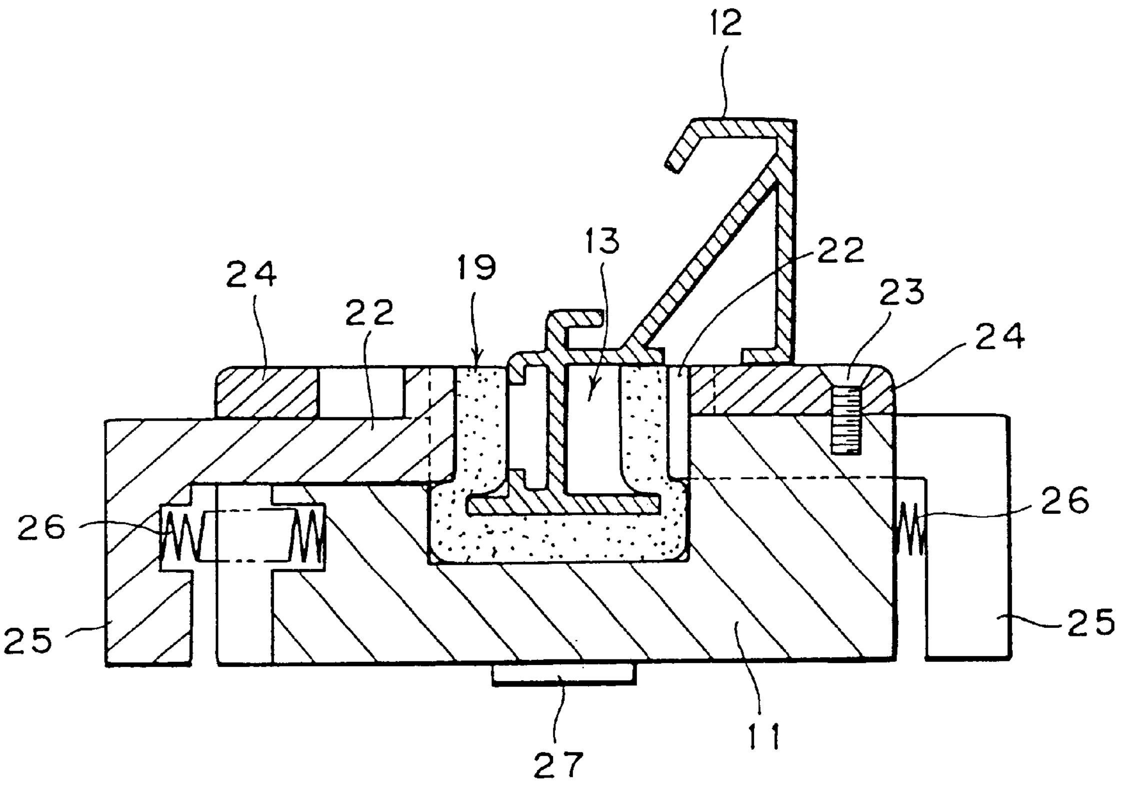
FIG. 6 is a section of one embodiment of the tape squeezing device which is illustrated in a condition during squeezing-operation.
Figure 9:
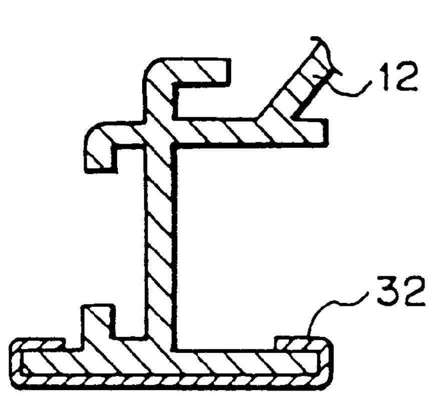
FIG. 9 is a conceptual illustration showing an application state of an adhesive tape relative to a door outer sash associating with progress of squeezing operation together with FIGS. 7 and 8.

At this condition, as shown in FIGS. 6 and 9, the portion of the door outer sash 12 applied the adhesive tape 32 is surrounded by the elastic sheet 19 in a compressed condition. The adhesive sheet running over both side edges in the width direction of the door outer sash 12 is folded back to be fitted onto the door outer sash 12 by means of the elastic sheet 19.

With maintaining this condition, the tape squeezing device is moved along the door outer sash 12 with pushing the adhesive tape guide roller 30 on one end in the width direction of the door outer sash 12 to fold back the adhesive tape 32 running over both side edges in the width direction of the door outer sash 12 to be fitted onto both end portions in the width direction of the door outer sash 12. At the same time, the bubble convoluted between the adhesive tape 32 and the door outer sash 12 can be pushed out.

Figure 10:
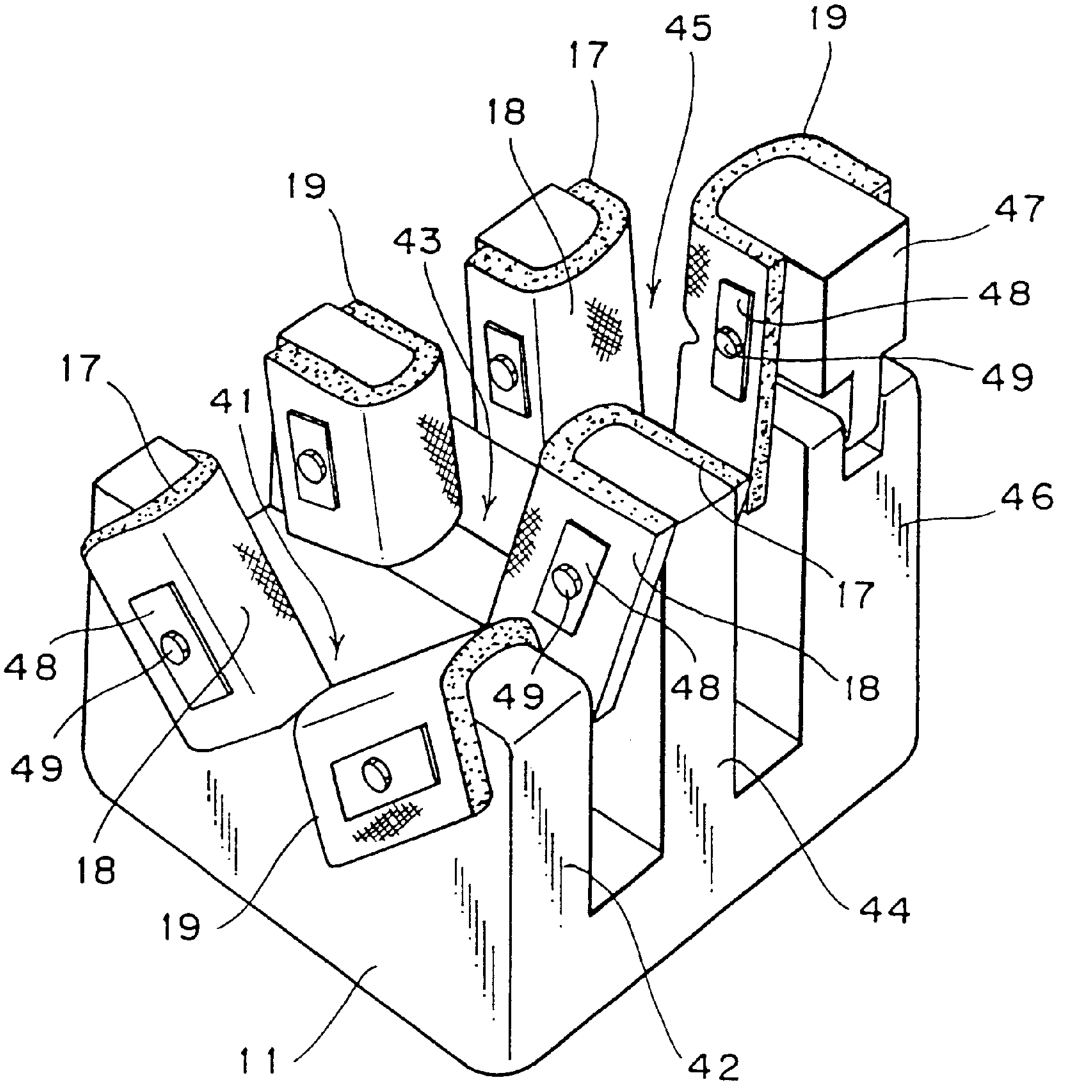
FIG. 10 is a perspective view showing an external appearance of another embodiment of the tape squeezing device according to the present invention.
Figure 11:
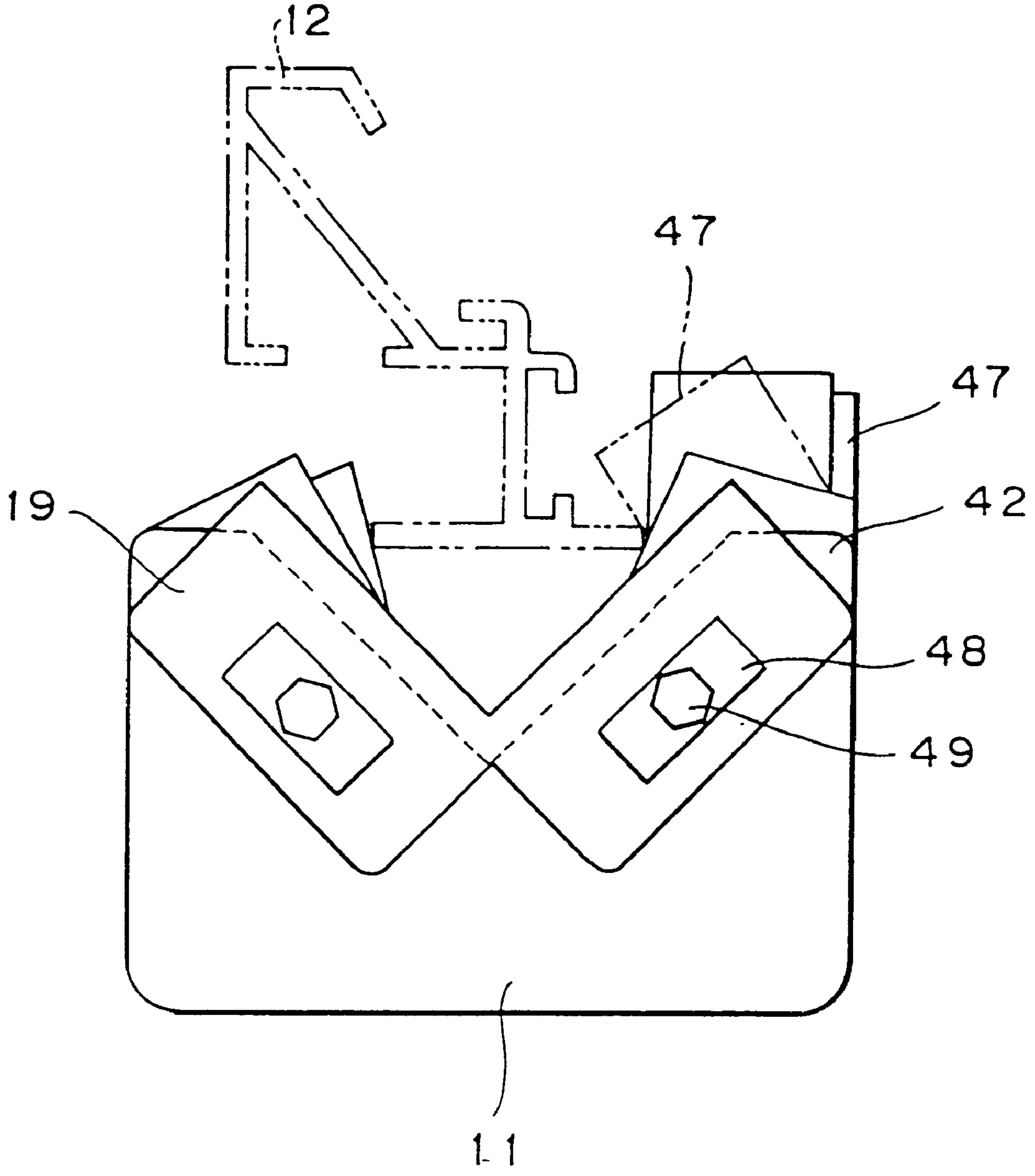
FIG. 11 is a front elevation of another embodiment of the tape squeezing device shown in FIG. 7.
Figure 12:
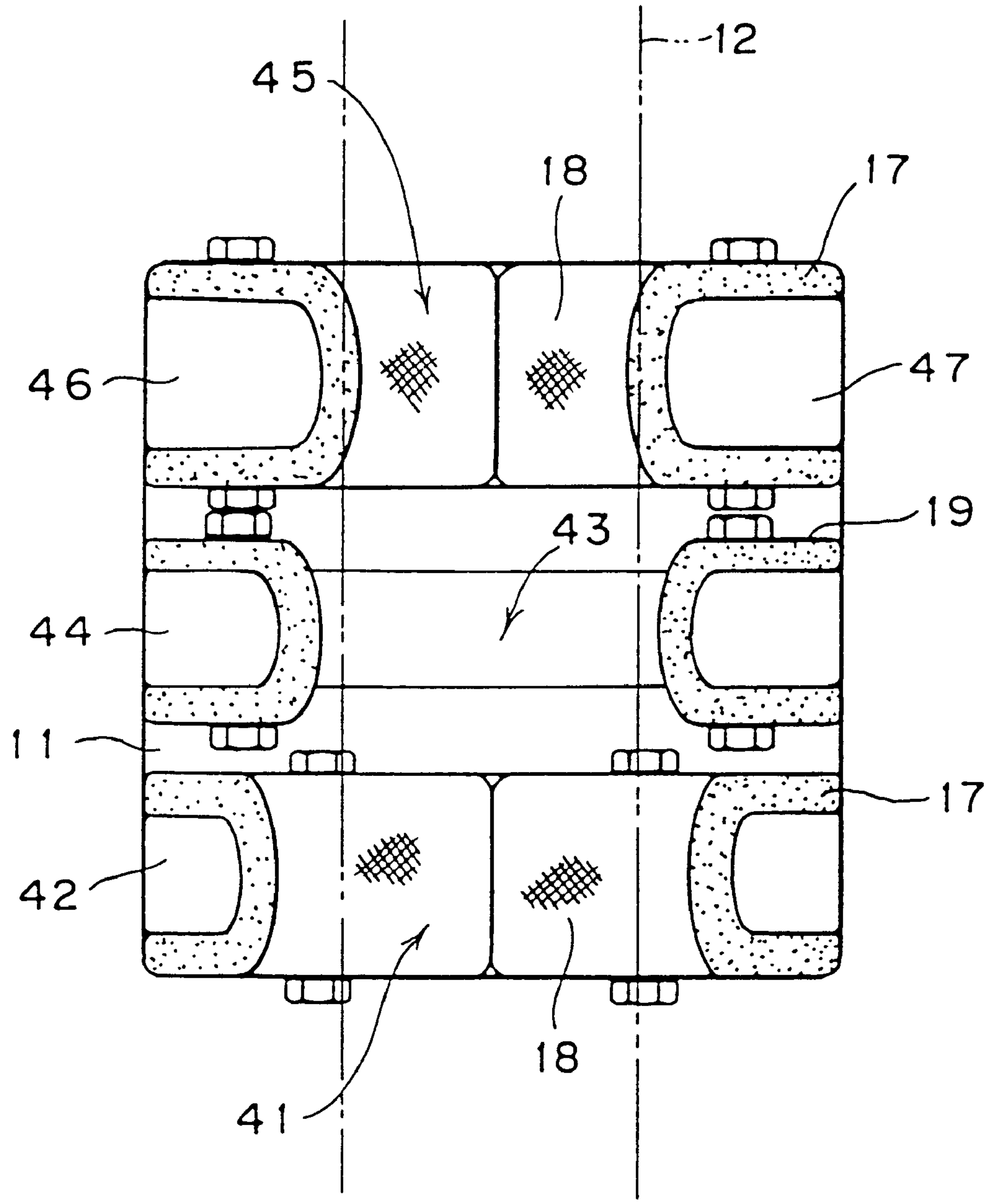
FIG. 12 is a plan view of another embodiment of the tape squeezing device shown in FIG. 7.

Next, the second embodiment of the tape squeezing device will be explained in detail with reference to FIG. 10 illustrating the external appearance thereof and FIGS. 11 and 12 respectively showing a front elevation and a plan view thereof. It should be noted that the members performing the same function as the former embodiment will be identified by the same reference numerals and the detailed description for such members will be neglected in order to avoid redundant discussion for maintaining the disclosure simple enough to facilitate clear understanding of the present invention.

Namely, on the main body, first wall portions 42 defining a V-shaped first groove portion 41, second wall portions 44 defining a second groove portion 43, which is formed with smaller open angle than open angle (an angle of 90 degrees in the shown embodiment) of the first groove portion 41, and third wall portions 46 defining a third groove portion 45 which is formed with further smaller open angle (an angle of 30 degrees in the shown embodiment) than open angle (i.e., an angle of 60 degrees in the shown embodiment) of the second groove portion 43. The first to third groove portions 41, 43 and 45 are formed with a predetermined interval, which becomes smaller in sequential order from the first groove portion 41 to the third groove portion 45.

One of the third wall portions 46 forming the third groove portion 45 has a tip end portion 47 which is pivotable about a not shown pin to further reduce a distance to the other side.

On the first to third wall portions 42, 44 and 46, the elastic sheet 19 is fixed by bolts 49 via respectively quadrangular washers 48 to cover the first to third groove portions 41, 43 and 45. One of the tip end portion 47 of the foregoing third wall portion 46 is in a condition biased in a direction away from the other by elastic force of the elastic sheet 19.

To attach adhesive tape onto the door outer sash 12, the tape squeezing device constructed as set forth above is pushed against the door of sash 12. Then, by moving the tape squeezing device relative to the door outer sash 12 in downward direction in FIG. 9, the door outer sash 12 is caught in the first to third groove portions 41, 43 and 45. Due to the elastic deformation of each respective elastic sheet 19, the adhesive tape 32 running over both side edges in the width direction of the door outer sash 12 is folded back toward both end portions in the width direction, and thereby fitted onto the door outer sash 12. In this case, one tip end portion 47 of the third wall portion 46 is bent inwardly against the elastic force of the elastic sheet 19 to ensure engagement between the tape squeezing device and the door outer sash 12 so that the adhesive tape is pushed onto the door outer sash with large force.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A tape squeezing device for folding back side edge portions in a width direction of a strip of adhesive tape applied on a work to run the side edge portions over respective side end portions of the work, comprising:

a main body formed with a V-shaped first groove portion having an open angle, a V-shaped second groove portion having a smaller open angle than the open angle of the first groove portion, and a V-shaped third groove portion having substantially the same open angle as the open angle of the second groove portion, each of the groove portions being spaced apart from one another at a predetermined interval;

an expandable elastic sheet fixed to the main body and arranged to contact the side end portions of the work and cover a portion of one of the three grooved portions, the elastic sheet having a cushion layer and a lubricating surface layer; and wherein the third groove portion has a base end portion integral with the main body and a tip end portion pivotable toward and away from the base end portion for permitting the open angle of the third groove portion to be reduced relative to the open angle of the second groove portion.

2. The tape squeezing device as claimed in claim 1, wherein the lubricating surface layer of the elastic sheet is a flexible cloth.

3. The tape squeezing device as claimed in claim 1, wherein the work is a door sash of an automotive vehicle.

* * * * *